Sept. 20, 1949.  R. C. TOWNSEND  2,482,564
GUIDE WHEEL SUSPENSION FOR ROAD-RAIL VEHICLES
Filed July 14, 1945  4 Sheets-Sheet 3
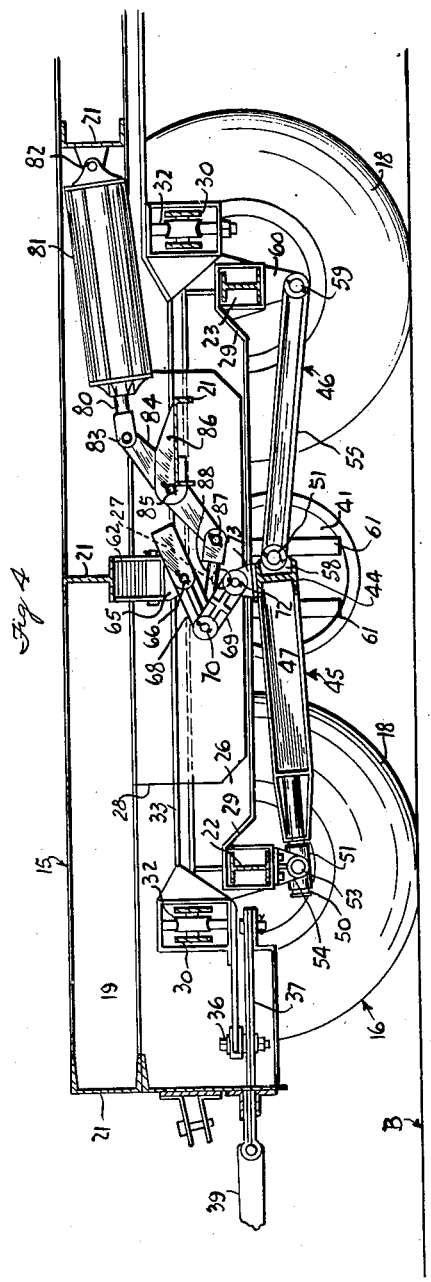
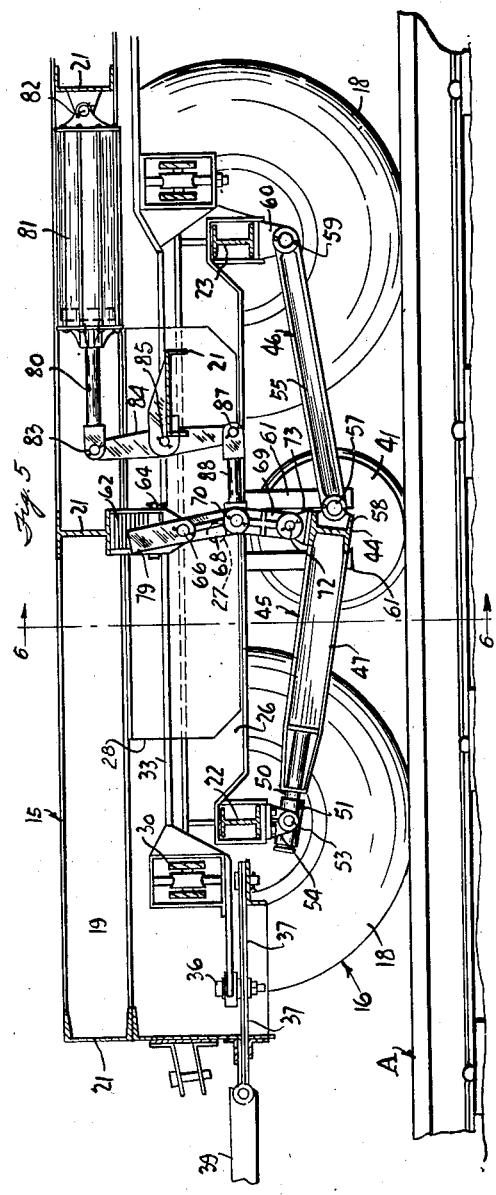
Roy C. Townsend
Inventor
By Carlsen + Hagen
Attorney Sept. 20, 1949.  R. C. TOWNSEND  2,482,564
GUIDE WHEEL SUSPENSION FOR ROAD-RAIL VEHICLES
Filed July 14, 1945  4 Sheets-Sheet 4
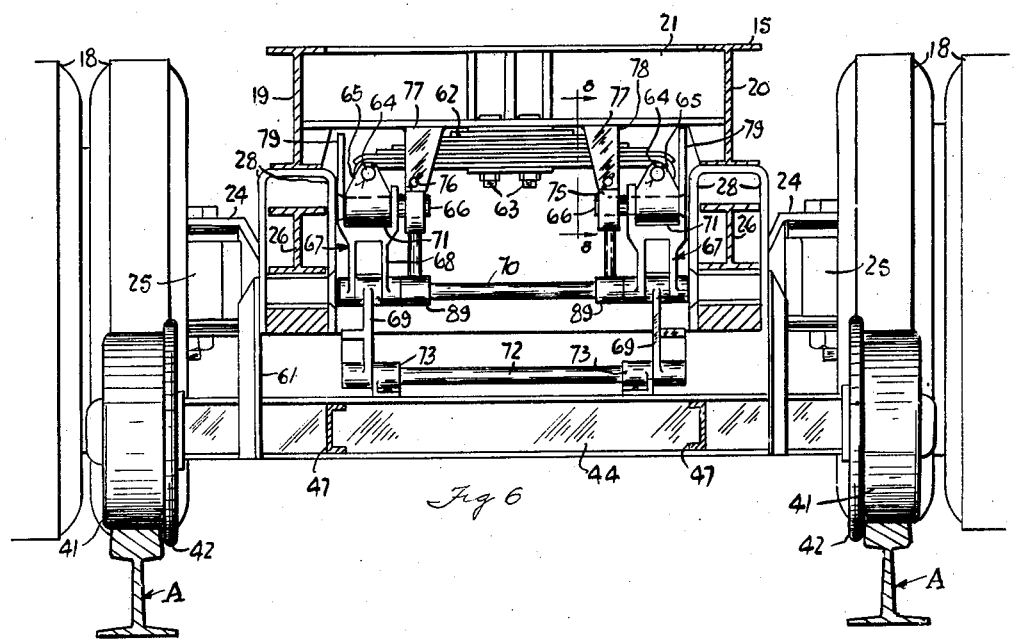
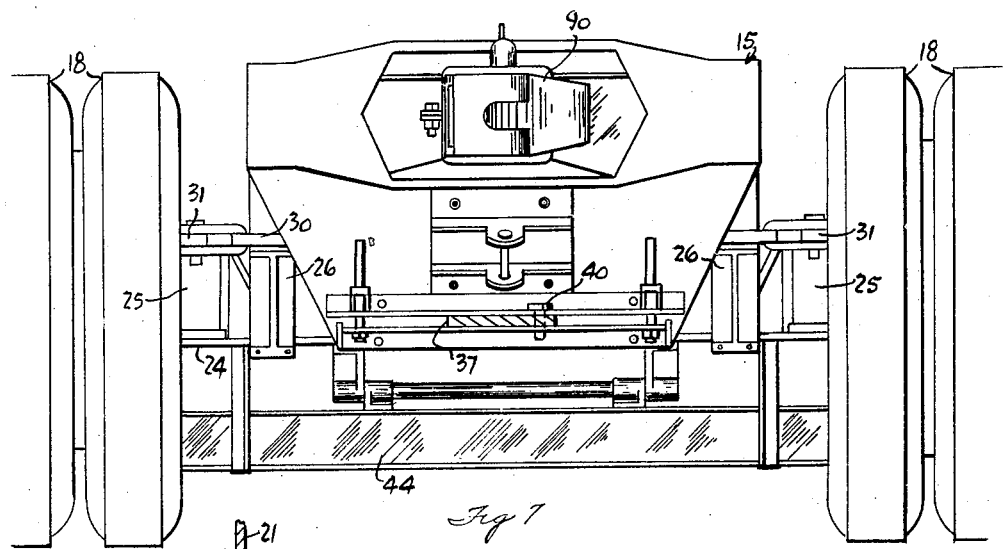
Inventor
ROY C. TOWNSEND
By Carlsen + Hazle
Attorney Patented Sept. 20, 1949

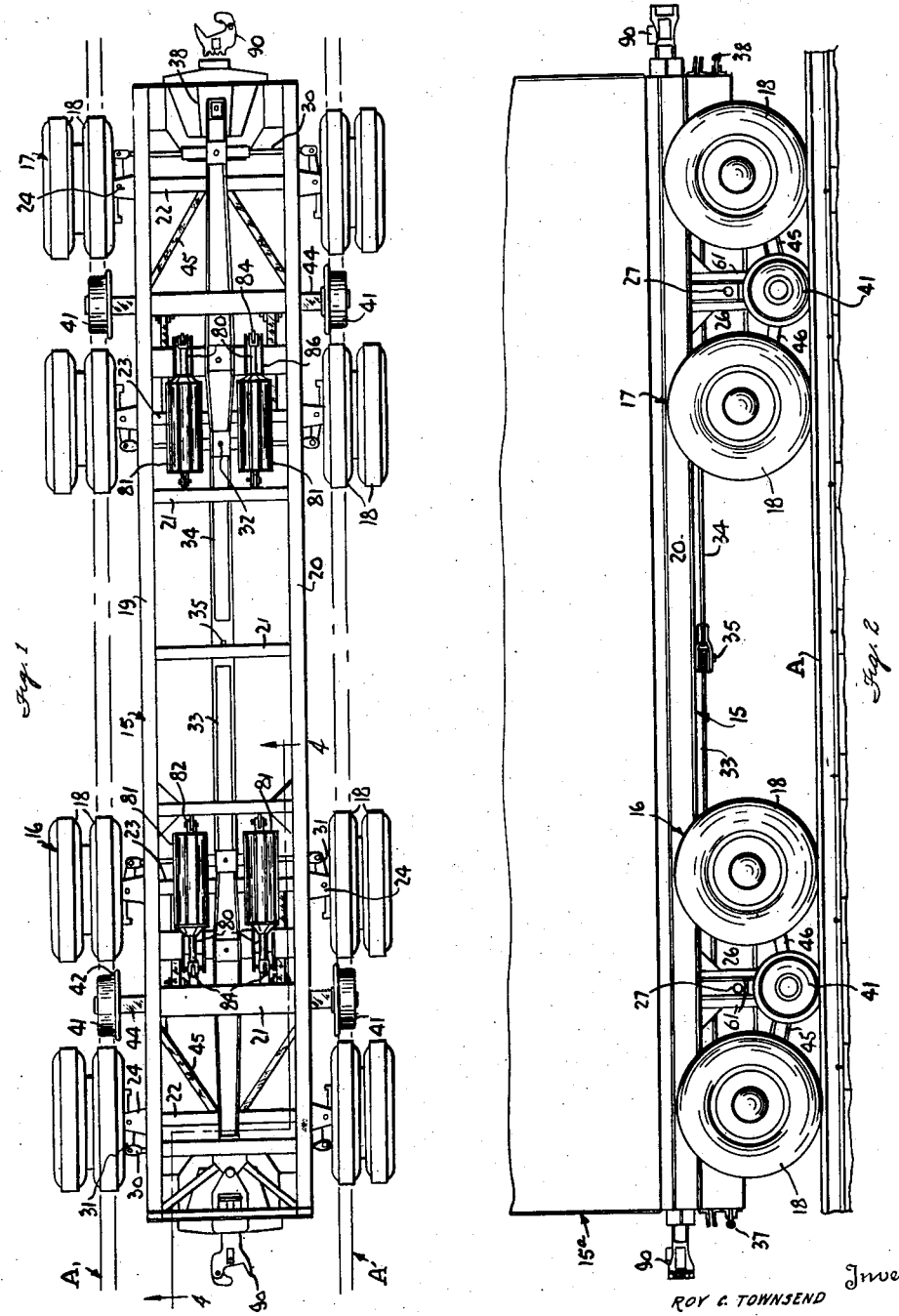

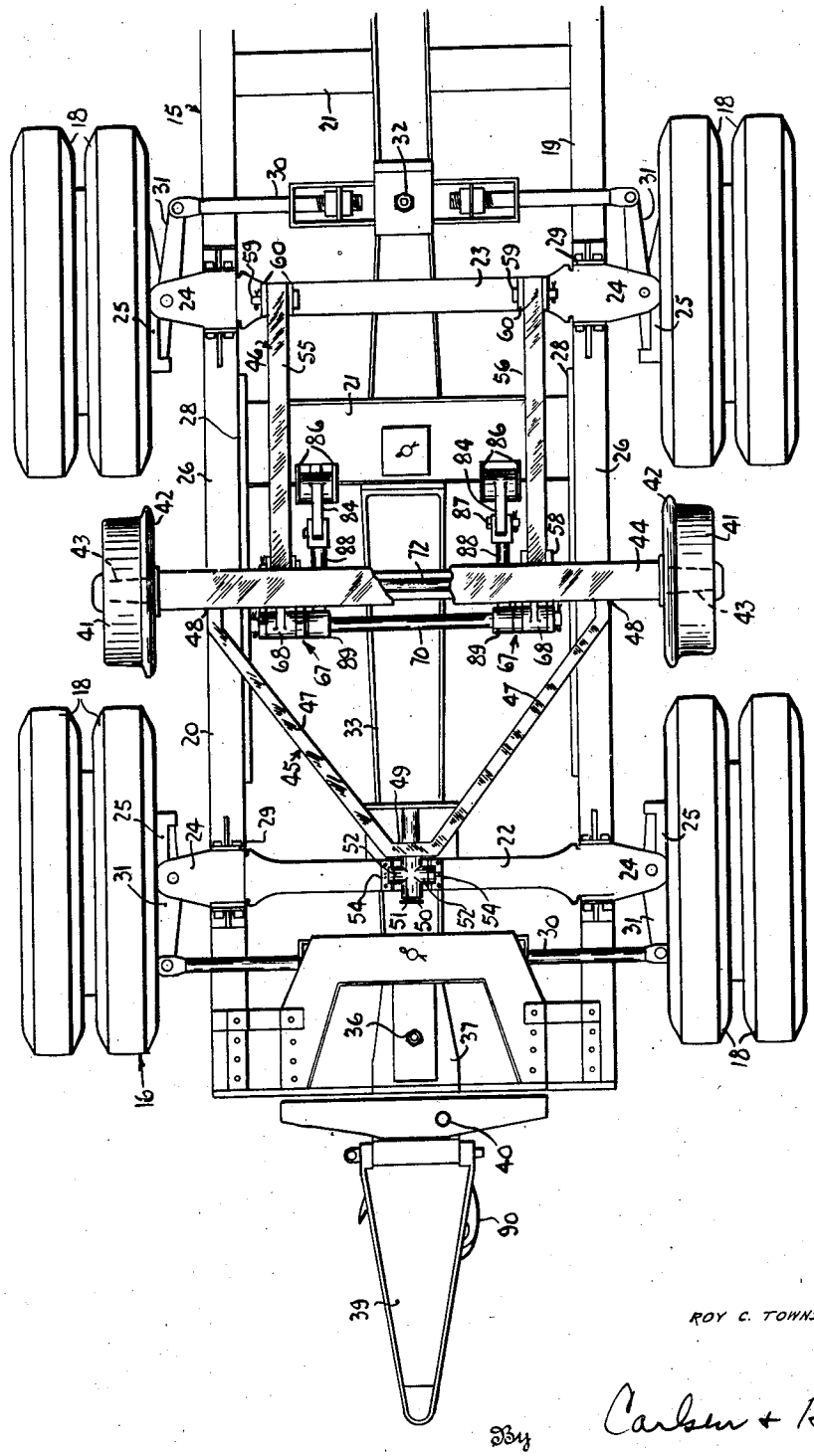

2,482,564

UNITED STATES PATENT OFFICE 2,482,564

GUIDE WHEEL SUSPENSION FOR ROAD-RAIL VEHICLES

Roy C. Townsend, La Crosse, Wis.

Application July 14, 1945, Serial No. 605,120

11 Claims. (Cl. 105—215)

This invention relates generally to improvements in combination vehicles of the type for use both on highways and railways.

Such vehicles employ the usual pneumatic tired wheels for their main support on both the highway and the rails of a railway track, but when operating on the railway further use flanged pilot wheels which are lowered onto the rails to properly guide the vehicle therealong.

It is the primary object of my present invention to provide a retractable pilot wheel mounting and assembly which is simple, strong and readily raised and lowered to move the wheels from operative to inoperative positions as required. Another object is to provide a pilot wheel suspension wherein the wheels, as they are lowered to run on the rails, are forced to take and support a part of the load of the vehicle, and with spring suspension for the wheels arranged to support them downwardly against the rails with a shock absorbing effect.

These and other objects of the invention will be disclosed in the course of the following specification, reference being had to the accompanying drawings, in which Fig. 1 is a top plan view of a tandem wheel, trailer type of vehicle embodying my invention, and illustrating the rails of a railway track in broken lines.

Fig. 2 is a side elevation, showing the vehicle in operation on a railway and with the pilot wheels lowered into running engagement with the rails.

Fig. 3 is an enlarged, inverted or bottom plan view of one end of the vehicle, showing one of the wheel suspension assemblies, and with the pilot wheel positioning cylinders omitted for clarity.

Fig. 4 is an enlarged, fragmentary, vertical and longitudinal sectional view taken substantially along the line 4—4 in Fig. 1, showing the vehicle in operation on a highway surface with the pilot wheels raised or retracted.

Fig. 5 is a similar view but showing the pilot wheels lowered into engagement with a track rail.

Fig. 6 is an enlarged vertical cross section along the line 6—6 in Fig. 5.

Fig. 7 is an end view of the vehicle.

Fig. 8 is a detail sectional view along the line 8—8 in Fig. 6.

Referring now more particularly and by reference characters to the drawing, I have shown therein a trailer or vehicle chassis designated generally at 15 of rectangular, elongated shape and supported adjacent each end by four wheeled trucks or wheel assemblies indicated generally and respectively at 16 and 17. Each wheel of the trucks is here shown as including dual tires 18. The vehicle is reversible end for end, or may be towed from either end, and the respective trucks 16 and 17 are essentially duplicates in construction and arrangement.

The chassis 15 comprises side beams 19 and 20 rigidly connected by appropriately located cross bars indicated throughout at 21 to form a rigid frame structure adapted to support any desired type of body or carrier such as indicated fragmentarily at 15ª in Fig. 2.

The particular vehicle here shown for illustration of my present invention is similar in all essential respects to that disclosed in my co-pending application, Serial No. 595,680, filed May 25, 1945, now Patent Number 2,431,626. The vehicle, per se, will accordingly be described herein only in such detail as to make clear the application thereto of the pilot wheel mechanism forming the subject matter of this invention. I do not, of course, limit myself to the use of my pilot wheel arrangement on trailers alone and it may be used as well on powered equipment of this rail-highway type.

Each truck 16 and 17 comprises longitudinally spaced, transverse axles 22 and 23 disposed beneath the chassis and at outer ends these axles are forked to provide vertically spaced apertured ears 24 between which are pivoted the bearing portions of knuckle members 25 which support the wheels 18. The arrangement is such that the wheels may all swing freely to steering angles as the vehicle travels a highway. Each truck also includes longitudinally extending equalizers 26 which are fulcrumed intermediate their ends at 27 between spaced side or guide members 28 depending from the frame sides 19 and 20. The ends of these equalizers have guides 29 which straddle the ends of the axles 22 and 23 so that the truck is given an equalizing action in a well known manner, and in a fashion similar to that shown in my prior Patent No. 2,316,374 for Vehicle supporting truck, issued April 13, 1943, to which attention is invited for a more complete description of this action.

The wheels 18 of the trucks 16 and 17 are steered, as may be required, by tie rods 30 which cross connect steering arms 31 on each transversely aligned pair of wheels. Where these tie rods traverse the longitudinal center line of the vehicle they are pivotally connected, as indicated generally at 32, to steering bars 33 and 34 of which there is one for each truck 16 and 17.

These steering bars 33 and 34 extend lengthwise through the chassis and are pivotally connected at the center thereof at 35. At opposite ends the steering bars are also pivotally connected at 36 to transversely oscillatable drawbars 37 and 38 to either of which, at its outer end, may be pivotally and detachably connected a tongue 39 for towing the vehicle. The arrangement is such, as pointed out in my co-pending application previously identified, that transverse swinging movements of the tongue 39 as the vehicle is towed around a curve will oscillate the steering bars 33 and 34 to angle the various wheels 18 as required to properly follow the curve.

When the vehicle is used on a railway the steering mechanism is locked, with the wheels in the straightaway positions here shown, by locking the drawbars 37 and 38 with pins 40 to hold them against oscillating movements.

For each truck 16 and 17 I provide a pilot wheel suspension mechanism which comprises a pair of pilot wheels 41 which are flanged as indicated at 42 in the conventional manner to run upon railway rails A. The wheels 41 are furthermore smaller than the wheels 18 and are arranged in line with the innermost tires of these wheels. The pilot wheels 41 are journaled at 43 upon the ends of an axle 44 and this axle is operatively arranged for up and down movements with respect to the vehicle so that the wheels may be moved to and between inoperative positions (Fig. 4) above and clear of a highway road surface B, and operative positions in running engagement with the track rails A (Figs. 2 and 5).

The axle 44 is supported for such movements by oppositely extending swingable drag frames indicated generally at 45 and 46. The frame 45 comprises a rigid V-shaped member having sides 47 secured by welding or otherwise at 48 at one end to the axle, and the apex or junction 49 of these frame sides 47 carries a pivot pin 50 which extends in a direction parallel with the direction of travel and toward the adjacent end of the vehicle. This pin 50 is pivotally and slidably mounted, for turning movements and for fore and aft movements, through a bearing sleeve 51 which has lateral apertured bearings 52 by which it is pivotally pinned at 53 to spaced bearing brackets 54 secured to the underside of the axle 22. The frame 46 comprises parallel, transversely spaced and longitudinally extending side arms 55—56 which are pivoted on transverse axes at opposite ends by pins 57 to brackets 58 affixed to the pilot wheel axle 44, and by pins 59 to brackets 60 secured to the other axle 23.

The foregoing arrangement is such that the drag frames 45 and 46 will transmit draft or drag in either direction to the pilot wheel axle 44 and will support the same for the required up and down movements in retracting or lowering the pilot wheels. In such operation the ends of the frames 45—46 attached to the axle 44 swing upwardly and downwardly as required, oscillating about the pivots 53 and 59 respectively, while the pin 50 slides back and forth in bearing sleeve 51 as required to accommodate the minor forward and rearward movement of the axle 44 as it is carried about a radius on the arms 55. The movements of the axle 44 are not, of course, strictly in a straight vertical direction but on a slight curve. The bearing sleeve 51 by its universal joint action, about the longitudinal axis of the pin 50 and the transverse axes of the pins 53, allows the main wheel axle 22 to oscillate in transverse planes as required by the equalizing action of the truck upon highway road surfaces without imposing twisting strains upon the pilot wheel axle 44, while the flexibility of the widely spaced and pivoted arms 55 of the frame 46 accomplishes the same purpose at this point.

The end portions of the axle 44 extend between upright longitudinally spaced guide and pick-up members 61 depending from adjacent chassis sides. These guides 61 may be arranged to engage diagonally opposite corners of the axle 44 when it is in operative position as seen in Fig. 5 as a further support for the axle in this position, and to relieve these parts of some strain.

A cantilever leaf spring 62 is secured by bolts 63 crosswise to the underside of one of the cross beams 21 immediately above the pilot wheel axle 44 and in parallel upwardly spaced relation thereto. The ends of the spring 62 terminate inwardly of the chassis sides 19 and 20 and are pivotally connected by pins 64 to depending shackles 65 which carry toggle pivot pins 66. Arranged between each of said shackles 65 and the axle 44 is a raising and lowering toggle or linkage mechanism 67 comprising upper and lower links 68 and 69 pivotally mounted at center, interdigitating ends upon a cross shaft 70 which extends between the toggles. The upper end of each upper link 68 is forked at 71 (Fig. 6) to embrace the corresponding shackle 65 to which it is connected by pivotally mounting it upon the pin 66. The lower end of each lower link 69 is pivotally mounted upon the end of a tie shaft 72 supported crosswise along the upper side of the axle 44 by bearing brackets 73. It will be obvious that by jackknifing the toggles 67, as seen in Fig. 4, the axle 44 and pilot wheels thereon will be raised, while as the toggles are unfolded or straightened out, as seen in Fig. 5, the axle will be lowered.

The inner ends of the pins 66 extend into vertically elongated slots 74 formed as best seen in Fig. 8 by U-shaped yokes 75 hung upon pins 76 from side plates 77 which are positioned at opposite sides of the spring 62 and rigidly secured, as by welds 78, to the cross beam 21. These slotted yokes 75 allow limited up and down movements of the toggles 67, and the axle 44, with the flexing of the spring 62, and along with the guiding effect of the side plates 77 on the spring, restrain these parts against forward or rearward displacement.

The outermost arms of the forked upper ends 71 of the upper toggle links 68 are elongated as indicated at 79 and are adapted to bear against the inner bolster guide plates 28 (Fig. 6) should there be any tendency of the entire pilot wheel assembly to shift in a lateral direction, and to prevent any pronounced movement in this direction.

The toggles 67 are folded and unfolded each by a separate fluid pressure operated plunger 80 extending into a cylinder 81 pivotally supported at 82 at the opposite end upon an adjacent cross beam 21 of the chassis. The plungers 80 of these cylinders then extend toward the respective toggle mechanisms 67 and at their extremities the plungers are pivoted at 83 to the upper ends of levers 84 of which there is one for each toggle. Said levers 84 are fulcrumed at 85 upon bearing ears 86 secured to a conveniently located cross beam 21 and the lower ends of the levers are pivotally attached at 87 to one end of actuating rods 88, the other ends of which are pivoted at 89 upon the cross shaft 70. The admission of fluid under pressure to the cylinders 81 will move the plungers 80 toward or away from the toggles, as will be evident, and the former movement will, through translation by the oscillation of the levers 84, straighten out or unfold the toggles (Fig. 5). The reverse movement will, of course, fold or jackknife the toggles (Fig. 4) and it will be noted that the pivotal mounting 82 of the cylinders 81 allow them to swing upwardly and downwardly to accommodate themselves to the swinging movement of the levers 84 in these operations.

The vehicle is shown as equipped with conventional railway couplers 90 at each end for use when railway operation is desired. The usual air brake systems may also be used for braking the wheels 18.

During highway operation the pilot wheels 41 are, of course, retracted or lifted and the entire weight of the vehicle and load is carried upon the pneumatic tired wheels 18 in the usual manner. It will be noted that the pilot wheels are raised high enough to provide adequate clearance for normal highway operations.

When the vehicle is to be used on railway tracks the pilot wheels are lowered by operation of the cylinders 81 until the wheels meet the rails A at which time they will guide the vehicle along the track. The parts are so proportioned that when the pilot wheels are fully lowered the ends of the spring 62 are upwardly tensioned and a part of the load is thus placed on the pilot wheels. This compensates for the fact that, while the weight is carried upon dual-tired wheels during highway operation, only one tire of each wheel 18 can, of course, ride the rails so that otherwise a double load would be placed on these tires.

In the unfolded position of the toggles 67, i. e., with the pilot wheels 41 riding the rails A, the toggle links 68 and 69 may, if desired or required, be locked against buckling beyond the slightly past dead center position (Fig. 5) they then assume by stop means embodied at any point in the linkage. For example, the links 68 and 69 might be limited in their movements, the levers 84 might have their movements limited or the outward travel of the plungers 80, required to unfold the toggles, may be limited for this purpose as indicated in Fig. 5.

It will be noted that the spring 62 in addition to providing shock absorbing suspension for the pilot wheels 41 also causes the entire pilot wheel mechanism to be self equalizing. That is, the pilot wheel axle 44 may oscillate upwardly and downwardly at its opposite ends through a limited range due to the flexibility afforded by the spring suspension.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a vehicle of the character described having a wheeled truck including spaced main axles supported for oscillating and equalizing movements in upright transverse planes, a pilot wheel axle positioned between said main axles and carrying flanged pilot wheels at its ends, means supporting the pilot wheel axle for up and down adjustments with respect to the vehicle, and swingable frames connected to the pilot wheel axle and extending in opposite directions therefrom, one of said frames including wide spread arms pivotally connected between one main axle and the pilot wheel axle, and the other frame being connected to the other main axle with a universal joint including a lost motion device permitting swinging movement of the pilot wheel axle on said arms and flexibility in upright transverse planes between all of said axles while effecting a positive connection between the pilot wheel axle and said other main axle when the pilot wheels are lowered to their track engaging vehicle supporting positions.

2. In a vehicle having a main frame, laterally disposed equalizers tiltably secured to the frame, main wheel supported axles connecting corresponding ends of the equalizers, a vertically adjustable pilot wheel axle disposed between the main axles and connected to said axles by fore and aft extending tie members, the tie member to one of the main axles being adjustable as to effective length when the pilot wheel axle is adjusted between operative and inoperative positions, and means for vertically adjusting the pilot wheel axle.

3. In a vehicle having a main frame, laterally disposed equalizers tiltably secured to the frame, main wheel supported axles connecting corresponding ends of the equalizers, a vertically adjustable pilot wheel axle disposed between the main axles and connected to said axles by fore and aft exending tie members, the tie member to one of the main axles being adjustable as to effective length when the pilot wheel axle is adjusted between operative and inoperative positions, and means movably attached to the main frame for vertically adjusting the pilot wheel axle.

4. In a vehicle having a main frame, laterally disposed equalizers tiltably secured to the frame, main wheel supported axles connecting corresponding ends of the equalizers, a vertically adjustable pilot wheel axle disposed between the main axles and connected to said axles by fore and aft extending tie members, the tie member to one of the main axles being adjustable as to effective length when the pilot wheel axle is adjusted between operative and inoperative positions, and means movably attached to the main frame for vertically adjusting the pilot wheel axle, said means including a lever mounted on the main frame and connected to a fluid actuated unit mounted on the main frame.

5. A supporting truck for a vehicle frame comprising a pair of equalizers fulcrumed to the frame in lateral positions, wheel supported main axles supporting the ends of the equalizers, a pilot wheel axle disposed between the main axles and connected to at least one of them for draft purposes, an adjustable supporting mechanism for the pilot wheel axle including a toggle device connecting the same to the frame in substantially the transverse vertical plane of the equalizer fulcrums, and fluid operated means for actuating the toggle device to raise and lower the pilot wheel axle.

6. A supporting truck for a vehicle frame comprising a pair of equalizers fulcrumed to the frame in lateral positions, wheel supported main axles supporting the ends of the equalizers, a pilot wheel axle disposed between the main axles and connected to at least one of them for draft purposes, and adjustable supporting mechanism for the pilot wheel axle including a cushioned toggle connection between the frame and pilot wheel axle, a piston-cylinder unit on the frame, and a lever device carried by the frame and connected to transmit motion from the piston-cylinder unit to the toggle connection.

7. A supporting truck for a vehicle frame comprising a pair of wheel supported main axles, equalizers connecting the axles and fulcrumed intermediate their ends to the frame, a vertically adjustable pilot wheel axle disposed between the main axles, a linkage device connecting the pilot wheel axle to the main frame, a power member attached to the frame, and a power transmitting lever connected at one end to the power member and at another end to the linkage device to raise and lower the pilot wheel axle between the main axles.

8. A supporting truck for a vehicle frame comprising a pair of wheel supported main axles, equalizers connecting the axles and fulcrumed intermediate their ends to the frame, a vertically adjustable pilot wheel axle disposed between the main axles, a linkage device connecting the pilot wheel axle to the main frame, a power member attached to the frame, and a power transmitting lever connected at one end to the power member and at another end to the linkage device to raise and lower the pilot wheel axle between the main axles, the upper end of the linkage device being connected to the main frame by a cushioning spring.

9. In combination with a vehicle supporting truck having equalizers supported on fore and aft wheels, a pilot wheel axle disposed between the fore and aft wheels and having pilot wheels at its ends, means for guiding the pilot wheel axle for up and down movement, a generally vertical toggle mechanism connecting the pilot wheel axle to the main frame, a generally vertical lever fulcrumed on the frame and connected at its lower end to the toggle mechanism, and a fluid actuated piston-cylinder unit attached at one end to the vehicle frame and at its other end to the upper end of the lever to actuate the latter.

10. In combination with a vehicle having supporting wheels, a pilot wheel axle extending transversely under the vehicle adjacent the wheels and mounted for vertical adjustment with respect to the frame, a suspension spring extending transversely of the frame over the pilot wheel axle and attached intermediate its ends to the frame, a pair of toggle link devices connecting the respective outer ends of the suspension spring to opposite end parts of the pilot wheel axle, and fluid operated mechanism for actuating the toggle link devices.

11. In combination with a vehicle having supporting wheels, a pilot wheel axle extending transversely under the vehicle adjacent the wheels and mounted for vertical adjustment with respect to the frame, a suspension spring extending transversely of the frame over the pilot wheel axle and attached intermediate its ends to the frame, a pair of toggle link devices connecting the respective outer ends of the suspension spring to opposite end parts of the pilot wheel axle, and fluid operated mechanism for actuating the toggle link devices, said mechanism including piston-cylinder members and lever acting devices mounted on the main frame.

ROY C. TOWNSEND.

REFERENCES CITED

The following references are of record in the file of this patent:

UNITED STATES PATENTS

| Number | Name | Date |
|--------|------|------|
| 455,842 | Smith et al. | July 14, 1891 |
| 1,446,784 | Carter | Feb. 27, 1923 |
| 1,801,469 | Wagner | Apr. 21, 1931 |
| 2,002,901 | Main | May 28, 1935 |
| 2,006,781 | Winkley | July 2, 1935 |
| 2,016,626 | Constantinesco | Oct. 8, 1935 |
| 2,043,703 | Main | June 9, 1936 |
| 2,116,797 | Nampa | May 10, 1938 |
| 2,140,421 | Fageol | Dec. 13, 1938 |
| 2,204,087 | Konetsky | June 11, 1940 |

FOREIGN PATENTS

| Number | Country | Date |
|--------|---------|------|
| 23,661 | Great Britain | Oct. 24, 1906 |
| 326,164 | Great Britain | Mar. 5, 1930 |